(No Model.)
M. REDLINGER & C. MORGAN.
BOLT NUT.
No. 520,802.      Patented June 5, 1894.
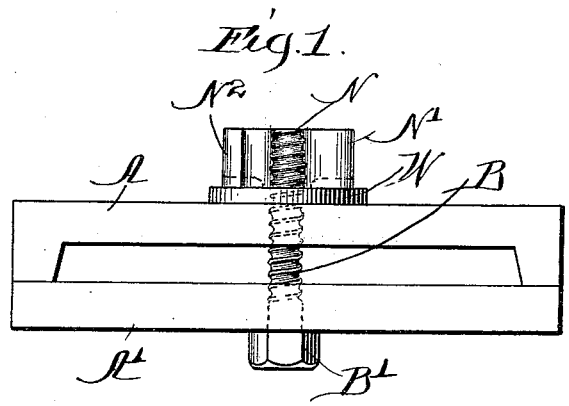
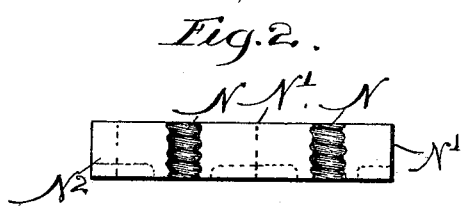
Witnesses:
Inventors
Michael Redlinger
and Charles Morgan

UNITED STATES PATENT OFFICE.

MICHAEL REDLINGER AND CHARLES MORGAN, OF FREEPORT, ILLINOIS, ASSIGNORS TO ALBERT BAUMGARTEN, EDGAR H. MORGAN, AND CHARLES MORGAN, OF SAME PLACE.

BOLT-NUT.

SPECIFICATION forming part of Letters Patent No. 520,802, dated June 5, 1894.

Application filed December 23, 1893. Serial No. 494,594. (No model.)

*To all whom it may concern:*

Be it known that we, MICHAEL REDLINGER and CHARLES MORGAN, both citizens of the United States, and both residing at Freeport, in the county of Stephenson and State of Illinois, have invented certain new and useful Improvements in Nuts for Bolts, of which the following is a specification.

Our invention relates to improvements in nuts for bolts, its object being to provide a cheap, simple and durable nut having sufficient elasticity to compensate for slight irregularities in the bolt which it engages; and also to afford sufficient friction to form a lock and prevent accidental rotation of the nut under ordinary conditions of use. To this end the nut is formed from sheet metal, preferably spring-steel, in approximately the manner shown in the accompanying drawings, in which—

Figure 1 is a side elevation of a bolt provided with a nut embodying our invention, the bolt and nut being in operative relation to two pieces connected by them. Fig. 2 is an elevation of the blank from which the nut is formed; and Fig. 3 is an end view of the completed nut, the blank being folded upon itself and its ends locked together.

In the views, A, A' are two pieces of metal, and B is a screw-threaded bolt passing through them and provided at one end with a head, B', of ordinary construction. On the opposite end of the bolt is mounted a nut formed from a sheet metal strip of suitable length and width folded lengthwise upon itself and having in its two members coacting screw-threaded beads or corrugations which embrace the bolt and engage the screw-threads formed upon it.

The screw-threaded portions of the nut are designated in the drawings by the letters, N, N, and the wings at either side thereof formed from the metal of the strip are designated by the letters, N², N'. The end, N³, of one of the members extends beyond the end of the other member and is locked upon it in the manner shown in Fig. 3, thereby locking the ends together and preventing undue separation of the two members. While the two members of the nut are thus secured together at each end thereof, they have sufficient elasticity to approach or recede from each other within slight limits, and this elasticity has two functions, one of which is to bind the nut firmly upon the bolt and form a friction lock, while the other is to adapt the nut to slight inequalities in the bolt.

We have had occasion to use a nut of this construction in combination with a cheap cast bolt, and in such use we have found the adaptability of the nut a great convenience.

Both edges of the strip may be straight if desired, and in that case the nut will have the form shown in side elevation in Figs. 1 and 2. It may be found preferable, however, to cut away the margin of the nut next to the surface on which it bears, in the manner indicated in dotted lines in Figs. 1 and 2, as this somewhat decreases the friction of the nut against the bearing surface of its edge. We have found it advisable to interpose a washer, W, between the nut and the piece which it clamps, as shown in Fig. 1.

Having now described and explained our invention, what we claim as new, and desire to secure by Letters Patent, is—

1. A nut made up of two members formed of a strip of sheet-metal folded upon itself, said members being formed with inwardly open co-acting screw-threaded beads adapted to embrace a bolt lying between them and to engage the threads thereof.

2. A nut made up of a strip of sheet-metal folded upon itself and having in its two members co-acting screw-threaded beads adapted to embrace and engage a bolt, the free ends of the strip being fastened together.

3. A nut formed from a sheet metal strip folded upon itself and having in its two members co-acting screw-threaded beads adapted to embrace and engage a bolt, one end of the strip being lapped over the other whereby the two are locked together.

MICHAEL REDLINGER.
CHARLES MORGAN.

Witnesses:
ALBERT HERBIG,
E. H. MORGAN.